United States Patent [19]

Chujo et al.

[11] 3,755,234

[45] Aug. 28, 1973

[54] PROCESS FOR PREPARING GRAFT COPOLYMER EMULSIONS

[75] Inventors: Kiyoshi Chujo; Shinji Tokuhara; Kazunobu Tanaka; Zenjiro Honda; Shoji Watanabe, all of Saitama, Japan

[73] Assignee: Diacel, Ltd., Higashi-ku, Osaka, Japan

[22] Filed: July 27, 1971

[21] Appl. No.: 166,567

[30] Foreign Application Priority Data

July 31, 1970  Japan.............................. 45/67202

[52] U.S. Cl. 260/29.6 WA, 260/29.6 WB, 260/875, 260/881, 260/884, 260/885, 260/886
[51] Int. Cl............................................. C08g 25/00
[58] Field of Search............ 260/17.4 GC, 29.6 WA, 260/875, 881, 884, 885, 886

[56] References Cited
UNITED STATES PATENTS 2,922,768   1/1960   Mino et al. ........................ 260/17.4

OTHER PUBLICATIONS

Iwakura et al., Die Makromolekware Chemie 98, 1–6 (1966)
Chemical Abstracts 69, 78082X (1968)

*Primary Examiner*—William H. Short
*Assistant Examiner*—E. A. Nielsen
*Attorney*—Woodhams, Blanchard & Flynn

[57] ABSTRACT

Vinyl monomers are graft-copolymerized with the aid of a tetravalent cerium salt as a polymerization initiator in an aqueous polyvinyl alcohol solution. Aqueous emulsions of graft copolymers of high concentration are prepared, which emulsions have a high film-forming property and a smooth consistency, but are free of any lumps.

8 Claims, No Drawings

PROCESS FOR PREPARING GRAFT COPOLYMER EMULSIONS

BACKGROUND OF THE INVENTION

1. Field of the Invention

The present invention relates to a process for preparing aqueous emulsions of polyvinyl alcohol graft copolymers.

2. Description of the Prior Art

It is known that vinyl monomers are graft copolymerized in the presence of a tetravalent cerium salt in an aqueous solution of a polymer containing hydroxyl group [J. Polymer Sci., Vol. 3, 242 (1958); ACS Polymer Preprint, Vol. 9, No. 1, 675 (1968); Kogyo Kagaku Zasshi, Vol, 64, No. 1, 213 (1961); Die Makromol. Chem. BAND. 98, 1 (1966), etc.]. Further, the preparation of aqueous emulsions by graft copolymerization of vinyl monomers in the presence of a tetravalent cerium salt, as an initiator, in aqueous polyvinyl alcohol solution has already been reported [Kobunshi Kagaku, 25, 375, 490 (1968)]. In addition, electrophotographic recording materials containing said emulsions as binders are known (refer to the Official Gazette of Japanese Pat. Publication No. 26711/1968). If the monomer compositions are selected suitably, films having a remarkably high strength and hardness, as compared with those of films prepared from ordinary aqueous polymer emulsions, can be obtained by casting of the emulsions at room temperature. However, according to these disclosures, the polymer concentrations (solid content) of the emulsions are all poor, i.e., lower than 16 percent by weight. Consequently, such emulsions have only a limited practical value, because if films are to be prepared from such emulsions, a long period of time is required for drying and the resulting films are very thin, or if the emulsions are to be used as paint vehicles or binders for paper-processing, paints, coating liquids for paper-processing or impregnation, solutions of a higher concentration cannot be obtained whereby the working efficiency becomes quite poor thereby increasing the number of repetitions of the coating or impregnation steps that are required.

If the solid content of the prior art aqueous emulsions of polyvinyl alcohol graft copolymers is increased, grains or lumps occur frequently in the emulsions and/or the film-forming property thereof deteriorates so that brittle or opaque films are obtained and, in extreme cases, only wrinkled films are obtained due to the strong contractibility of the film.

An attempt has been made to obtain emulsions of high solid content by concentrating aqueous emulsions of polyvinyl alcohol graft copolymers initially having a lower solid content, but this resulted in failure, because the viscosities of the emulsions became too high for practical use or the storage stability of the emulsions was reduced.

After intensive investigations of processes for preparing aqueous emulsions of graft copolymers having high solid contents and low viscosities for the purpose of overcoming the above-stated defects, we have discovered the present invention.

SUMMARY OF THE INVENTION

According to the process of the present invention, graft copolymerization is initiated by adding a tetravalent cerium salt as a graft copolymerization initiator to a mixture of 18-35 parts by weight of polyvinyl alcohol and 82-65 parts by weight of vinyl monomers. The polyvinyl alcohol is used in the form of an aqueous solution of polyvinyl alcohol having an average degree of polymerization of 450 - 1,200 and a degree of saponification of 96 - 99 percent. There is obtained an aqueous emulsion having a solid content of 22 - 32 percent by weight. By the process of the invention it is possible to obtain aqueous emulsions of graft copolymers (which term includes block copolymers) of high solid content, high film-forming properties and smooth consistency, but free from lumps.

According to the process of the present invention, aqueous emulsions of graft copolymers having a solid content of 22 - 32 percent by weight and low viscosities, but free from grains or lumps, can be obtained and these emulsions are capable of forming films of a tensile strength of above 400 kg/cm$^2$ by selecting the monomer compositions suitably.

The polyvinyl alcohol used in the process of the invention has an average degree of polymerization in the range of 450 - 1,200. The average degree of polymerization of polyvinyl alcohol can be calculated easily by measuring the viscosity of an aqueous solution thereof according to JIS-K 6,726–1965. Either a single polyvinyl alcohol or a blend of two or more grades of polyvinyl alcohols, each having an average degree of polymerization in the range of 450 - 1,200, can be used in the present invention. In some cases, smooth emulsions, free from lumps, can be prepared even when the polyvinyl alcohol has a degree of polymerization below 450. However, in such cases, the films obtained by casting of the emulsions are brittle and not practical. On the other hand, when the degree of polymerization is above 1,200, gelation occurs during the polymerization and, consequently, an emulsion of a high concentration having a high solid content of 22 - 32 percent by weight cannot be obtained. The degree of saponification of the polyvinyl alcohol used in the process of the present invention should be in the range of 96 - 99 percent. When the degree of saponification is below 96 percent, frequently, the viscosity is increased remarkably during the graft copolymerization to cause gelation and the resulting films formed by casting are not water-proof or they are brittle. On the other hand, when the degree of saponification is above 99 percent, remarkable increases in viscosity, gelation and/or phase separation are caused and an acceptable emulsion cannot be obtained, perhaps due to the high crystallinity of the polyvinyl alcohol.

As the tetravalent cerium salts used in the process of the present invention, there may be used cerium sulfate, cerium nitrate, ammonium cerium sulfate, ammonium cerium nitrate, ammonium cerium pyrophosphate and cerium iodide. The concentration of the serium salt is not critical, but the preferred concentration is 0.05 - 2 molar percent, most preferably 0.1 - 1 molar percent, based on moles of the monomers in the polymerization mixture. The graft polymerization reaction is desirably carried out under acidic conditions and good results are obtained if the reaction is carried out at a pH lower than 6.0, particularly lower than 3.0. As the pH during the polymerization is reduced, the toughness of the resulting films is increased but the emulsion viscosity is likely to increase. For adjusting the pH of the polymerization mixture, nitric acid, hydrochloric acid, sulfuric acid, formic acid or the like can be used. However, sulfuric acid sometimes exerts an undesirable influence on the heat resistance or the weather resistance of the resultant films. The mode of addition of such acid influences the properties of the reaction products. If a large quantity of an acid is added during the initial stage of the reaction, the resulting emulsion is likely to increase in viscosity. Therefore, the quantity of acid added during the initial stage of the reaction, although it depends upon the total quantity of acid to be added during the polymerization reaction, is preferably below 25 percent of the total quantity of acid added. During the polymerization, the reaction mixture must be kept at a low pH, but after completion of the polymerization, it is preferable, from a practical viewpoint, to adjust the pH of the polymerization mixture to above 3.0 by adding caustic alkali, ammonia or an organic base such as an amine.

In the process of the present invention, the weight ratio of vinyl monomers to total polyvinyl alcohol should be 82 – 65 parts by weight of vinyl monomers to 18 – 35 parts by weight of polyvinyl alcohol (to obtain a total of 100 parts by weight of the mixture of vinyl monomers and polyvinyl alcohol). Under certain circumstances, an emulsion can be prepared even if the total quantity of polyvinyl alcohols is lower than 18 parts by weight, but it is impractical, bacause it cannot yield a continuous film by casting or it yields only a quite milky film. If the total quantity of polyvinyl alcohol is above 35 parts by weight, a remarkable increase in viscosity, gelation or phase separation occurs during the graft copolymerization. The particularly preferred quantity of total polyvinyl alcohol in the polymerization mixture is in the range of 20 – 30 parts by weight.

Various polymerizable vinyl monomers can be used in the process of the present invention. Examples of vinyl monomers are methacrylates having an alkyl group of one – 18 carbon atoms, such as methyl methacrylate, ethyl methacrylate, n-butyl methacrylate and lauryl methacrylate; acrylates having an alkyl group of 1 – 18 carbon atoms, such as methyl acrylate, ethyl acrylate, n-butyl acrylate, isobutyl acrylate and 2-ethylhexyl acrylate; acrylonitrile, methacrylonitrile; styrene, α-methylstyrene, p-chlorostyrene; vinyl esters of fatty acids having one – 18 carbon atoms such as vinyl formate, vinyl acetate, vinyl propionate, vinyl n-butyrate, vinyl pivalate, vinyl laurate, vinyl stearate and vinyl versatate; crotonic acid esters having alkyl groups of one – 18 carbon atoms, such as methyl crotonate, ethyl crotonate, butyl crotonate, octyl crotonate, 2-ethylhexyl crotonate and stearyl crotonate; vinyl chloride and vinylidene chloride. Of course, it is possible to copolymerize the above monomers together with a small quantity (less than 5 parts by weight per 100 parts by weight of the main vinyl monomers described above) of monomers such as acrylic acid, methacrylic acid, crotonic acid; maleic acid, fumaric acid, itaconic acid and monesters (for example, monobutyl esters) or diesters (for example, dimethyl esters, dibutyl esters, 2-ethylhexyl esters, and octyl esters) of these polymerizable unsaturated carboxylic acids; acrylamide, methacrylamide, N-methylolacrylamide or ethers thereof; so-called reactive monomers containing a functional group such as hydroxyethyl methacrylate, hydroxyethyl acrylate, glycidyl methacrylate, glycidyl acrylate and vinyl crotonate.

Films having a tensile strength covering a wide range of from several hundreds kg/cm$^2$ (e.g. 400 kg/cm$^2$) to several tens kg/cm$^2$ (e.g. 40 kg/cm$^2$) can be obtained by casting aqueous emulsions of graft copolymers obtained from suitable combinations of (1) monomers which yield hard polymers (having glass transition temperatures of above 30° C.) such as methyl methacrylate, acrylonitrile, styrene and vinyl chloride and (2) monomers which yield soft polymers (having glass transition temperatures of below 10° C.) such as acrylic acid esters having an alkyl group containing one – 18 carbon atoms, preferably one – 8 carbon atoms, such as methyl acrylate, ethyl acrylate, n-butyl acrylate and 2-ethylhexyl acrylate, methacrylic acid esters having an alkyl group containing 5 – 12 carbon atoms such as n-hexyl methacrylate, octyl methacrylate, 2-ethylhexyl methacrylate and lauryl methacrylate, and vinyl esters of fatty acids containing three – 18 carbon atoms such as vinyl propionate, vinyl n-butyrate, vinyl pivalate, vinyl laurate, vinyl stearate and vinyl versatate. In such a case, the quantity of monomers which yield soft polymers is desirably within the range of 5 – 70 percent by weight based on the total monomers in the polymerization mixture. Consequently, the quantity of monomers which yield hard polymers is 30 – 95 percent by weight based on the total monomers. If the quantity of monomers which yield soft polymers is less than 5 percent by weight based on the total monomers, the resulting aqueous emulsions of graft copolymers are likely to be of increased viscosity and films prepared from such emulsions are brittle or opaque. On the other hand, if the quantity of said monomers which yield soft polymers is above 70 percent by weight, the hardness of the resulting films is apt to be low.

It is to be noted that the transparency of films prepared from the emulsions prepared according to the invention is improved gradually as the refractive index of the copolymers approaches the refractive index of polyvinyl alcohols by suitable selection of combinations of the monomers. If the refractive index of the polymer is substantially the same as that of polyvinyl alcohol, the resulting film is nearly transparent. Examples of such combination of monomers are acrylonitrile/n-butyl acrylate 100/0–75/25, styrene/n-butyl acrylate 60/40–50/50, styrene/methyl methacrylate/n-butyl acrylate 30 – 60/55 – 25/10 – 25. acrylonitrile/methyl methacrylate/n-butyl acrylate 0 – 100/100 – 20/0 – 40, styrene/methyl methacrylate/a-crylonitrile/methyl acrylate 30 – 50/20 – 40/30 – 0/10 – 20. These examples are covered by the below-described preferred embodiments of the present invention. In view of the above fact and also the facts that the section of such a film according to electron microscopic photography is not uniform and that two peaks are shown in dynamic viscoelasticity loss and also in view of the proportion of polyvinyl alcohol to monomer, it is apparent that films obtained according to the process of the present invention have a complex structure in which graft polymer particles are attached closely to a continuous phase of polyvinyl alcohol.

Though the mode of the addition of polyvinyl alcohol is not critical in the process of the present invention, it is preferred to charge a major part of the polyvinyl alcohol during the initial stage of the graft copolymerization reaction and to add the remainder during the aging or after completion of the aging, rather than to charge the total quantity of polyvinyl alcohol during the initial stage. It is most preferred to charge 70 to 85 percent by weight, i.e., 70 – 85 parts by weight (from a total of 100 parts by weight) of polyvinyl alcohol during the initial stage of the graft copolymerization and to add the remaining 15 – 30 parts by weight during the aging or after completion of the aging of the graft copolymer.

If more than 85 percent by weight, i.e., 85 parts by weight (from a total of 100 parts by weight) of polyvinyl alcohol is added during the initial stage of the graft copolymerization, the viscosity of the resulting aqueous emulsion of graft copolymer increases remarkably. On the other hand, if the quantity of polyvinyl alcohol added during the initial stage is less than 70 percent by weight, i.e., 70 parts by weight (from a total of 100 parts by weight), the resistance to water and acids of the films prepared from the emulsion are reduced and the transparency of the films also is reduced. The term "initial stage" of graft copolymerization in this specification means the stage in which initially charged polyvinyl alcohol, vinyl monomers and a catalyst system form a homogeneous emulsified dispersion to initiate the polymerization. The term "aging" means the stage in which the reaction is completed or in which the graft copolymerization reaction becomes relatively slow.

Although the manner of addition of the monomers is not particularly critical, if the graft copolymerization is carried out on a large scale, it is desirable to add a part of the monomers during the initial stage of the copolymerization and to add the remainder continuously or at certain intervals over a period of several hours in order to avoid a violent exothermic reaction.

As for the mode of adding the tetravalent cerium salt as an initiator of graft copolymerization in the present invention, it is preferred to add 5 – 30 percent by weight, preferably 10 – 20 percent by weight, based on the total cerium salt used, during the initial stage of the graft copolymerization and to add a part of the remainder, i.e., 5 – 15 percent by weight, at the time of aging. The remainder is added during the course of the polymerization reaction.

If a large quantity of the cerium salt is added at one time, for example, more than 30 percent by weight based on the total quantity of cerium salt is added in the initial stage of the graft copolymerization, a violent exothermic reaction occurs and control of the temperature during the graft copolymerization is difficult. On the other hand, if the quantity of cerium salt added during the initial stage of graft copolymerization is less than 5 percent by weight based on the total cerium salt added, the water resistance of dry films obtained from the resulting aqueous emulsion of the graft copolymer is somewhat inferior.

The cerium salt is added in the form of an aqueous solution containing 0.3 – 1 N of the above-described acids for adjusting the pH. The polymerization temperatures may be varied over a wide range. The reaction proceeds smoothly at a low temperature of about 20° C. and the reaction can be effected also at a high temperature of about 80° C. In general, films obtained by polymerization at a low temperature have good strength and water resistance. The preferred temperatures are in the range of 40° – 65° C.

The mechanism of forming graft polymers according to the process of the present invention is considered to be as follows:

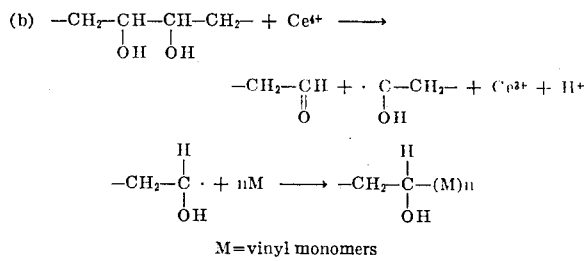

$M$ = vinyl monomers

By the reaction a), graft polymers are produced and by the reaction b), block polymers are produced. In the present invention, the above graft polymers and block polymers are both called graft polymers without distinction between them.

The aqueous emulsions of graft copolymers prepared according to the present invention may have added thereto a surface active agent, a plasticizer, a film-forming assistant, a defoaming agent and a mold-proofing agent depending upon the desired properties thereof. According to the process of the present invention, aqueous emulsions of graft copolymers (including block copolymers) of a high solid content of about 22 – 32 percent by weight having good film-forming properties and smooth consistency, but free from lumps, can be obtained. This result has not been expected. Thus, the present invention is a substantial improvement of great practical significance.

Aqueous emulsions of polyvinyl alcohol graft copolymers prepared according to the process of the present invention are useful for the preparation of paints, adhesives, coating agents for paper-processing, impregnating agents for paper-processing, coating agents (or binders of the coating agents) for cellophane or plastic film, films and fibers (for example, fibers prepared by emulsion spinning).

The process of the present invention will be further described by reference to the following examples, which are given to illustrate, but not limit, the invention.

The various properties of aqueous emulsions and films made thereof in the following Examples were measured in the following manner:

Solid content: measured by the weight change that occurs before and after drying at 110°–120°C. for 5 hours (wt. percent).

Viscosity: Brookfield BL type viscosimeter at 20°C., 30 r.p.m. (cps.).

Tensile strength and elongation: The moisture of the film is controlled to be 65 percent RH at 20°C. followed by measurement with a Tensilon tensile tester (a product of Toyo Seiki Co., Ltd.; type SS-7D-E-DTF). (Kg/cm² and percent).

Hardness: control of the moisture of the film in the same manner as above, followed by treatment with a sharpened lead of a pencil (trade name "UNI" of Mitsubishi Co.). The upper limit value of the pencil hardness at which the film is not damaged is shown.

In the Examples, all parts are by weight, unless otherwise specified.

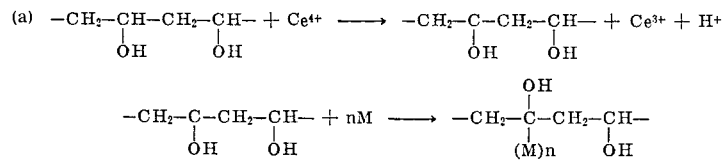

EXAMPLE 1

Forty and one-half (40.5) parts of commercial polyvinyl alcohol having a degree of saponification of 98.5 percent and a degree of polymerization of 500 were dissolved in 408 parts of water and the solution was kept at 60° C. To the solution was then added 1/10 of the below listed quantities of the following monomer mixture and catalyst. The mixture was stirred for 0.5 hour to effect graft copolymerization.

Monomer mixture;

| | |
|---|---|
| styrene | 72 parts |
| acrylonitrile | 36 |
| methyl methacrylate | 48 |
| methyl acrylate | 16 |
| total | 172 parts |

Catalyst; 60 parts of 0.1 molar solution obtained by dissolving ammonium cerium nitrate [$Ce(NO_3)_4NH_4NO_3 \cdot 2H_2O$] in 0.5 N nitric acid solution.

Thereafter, the remainder of the monomer mixture and 8/10 of the catalyst were instilled at a constant rate over a period of 3.5 hours. After completion of the instillation, the remaining 1/10 quantity of the catalyst was instilled over a period of about 10 minutes. Then, 45 parts of 30 percent aqueous solution of the same polyvinyl alcohol as used in the initial stage were added therein and the whole was stirred for 50 minutes to effect aging. After cooling, the pH of the polymerization mixture was adjusted to 4.2 with 3 N caustic soda. The resulting emulsion had a solid content of 29.1 percent and a viscosity of 330 cps. and it was a desirable emulsion free from lumps or grains. Films obtained by casting and drying the emulsion at room temperature were colorless, transparent films having the following properties:

| | |
|---|---|
| Tensile strength | 380 kg/cm² |
| Elongation | 8.3 percent |
| Hardness | 2 H |

EXAMPLES 2 – 6

Graft copolymerization was effected in the same manner as in Example 1 except that the monomer compositions and the proportions of the monomers were changed as shown in Table 1. The resulting emulsions were all good products having low viscosities. The solid content in all cases was above 28.5 percent. Smaller differences in the refractive index between polyvinyl alcohol and the graft polymer particles yielded superior transparency of the resulting dry film.

TABLE 1

| | Monomer composition | Proportion of monomers | Difference in refractive index between polyvinyl alcohol and graft polymer particles* | Transparency of film |
|---|---|---|---|---|
| Example 2 | styrene/n-butyl acrylate | 80/20 | 0.05 | slightly milky |
| Example 3 | styrene/n-butyl acrylate | 70/30 | 0.03 | almost transparent |
| Example 4 | styrene/n-butyl acrylate Acrylonitrile/methyl methacrylate/ n-butyl acrylate | 55/45 | 0 | transparent |
| Example 5 | methyl methacrylate/ n-butyl acrylate | 40/40/20 | 0.03 | transparent |
| Example 6 | methyl methacrylate/ n-butyl acrylate | 80/20 | 0.03 | transparent |

* The refractive index of the graft polymer particles was calculated according to proportional allocation from refractive indexes of respective homopolymers and propor-tions by weight thereof, in which following refractive index values were used. The names in parentheses are reference publications.

| | | |
|---|---|---|
| Polyvinyl alcohol | 1.510 | (Plastic Handbook published by Asakura Book Store in 1969) |
| Polymethyl methacrylate | 1.494 | (Kobunshi 11 (128), 1153 (1962)) |
| Polyacrylonitrile | 1.505 | (Polymer Handbook published by Interscience Co. in 1966) |
| Polystyrene | 1.575 | (Kobunshi, 11 (128), 1109 (1962)) |
| Polybutyl acrylate | 1.416 | (Kobunshi, 11, (128), 1095 (1962)) |

EXAMPLES 7–10

Thirty-three (33) parts of polyvinyl alcohol having various degrees of saponification and polymerization as shown in Table 2 were dissolved each in 475 parts of water and temperatures of the solutions were elevated to 60° C. To the respective solutions was then added 119 parts of the same monomer mixture as in Example 1 and 1/10 of the stated quantity of catalyst. Polymerization was carried out at 60° C. for 0.5 hour. Thereafter, the remainder of the monomer mixture and 8/10 of the quantity of the catalyst were instilled at a constant rate over a period of 3.5 hours. Then, the remainder of the catalyst was instilled over a period of 10 minutes. Forty-eight (48) parts of a 23 percent aqueous solution of the same polyvinyl alcohol as used in the initial stage were added and aging was effected at 60° C. for 50 minutes. Good emulsions having solid contents of above 22.1 percent and free from lumps or grains were obtained.

TABLE 2

| | Polyvinyl alcohol | | viscosity of emulsion (CPS.) | Solid content of emulsion (%) |
|---|---|---|---|---|
| | Degree of polymerization | Degree of saponification (%) | | |
| Example 7 | 560 | 96.9 | 280 | 22.2 |
| Example 8 | 700 | 98.5 | 310 | 22.3 |
| Example 9 | 1000 | 98.5 | 580 | 22.1 |
| Example 10 | 1200 | 98.5 | 800 | 22.9 |

EXAMPLE 11

Graft copolymerization was effected in the same manner as in Example 1 except that the polyvinyl alcohol used was in the form of mixture (1 : 3 parts by weight) of two polyvinyl alcohols having degrees of polymerization of 1700 and 300, respectively, and the degree of saponification of both alcohols was 98.5 percent. The resulting emulsion, free from lumps or grains, had a solid content of 27.2 percent. The viscosity of the emulsion was 420 cps. and the resulting dry films were tough and transparent.

EXAMPLE 12

Graft copolymerization was carried out in the same manner as in Example 1 except that 540 parts of 6.11 percent aqueous solution of polyvinyl alcohol having a degree of saponification of 98.5 percent and a degree of polymerization of 1100 were added during the initial stage of the graft copolymerization and 44 parts of 25 percent aqueous solution of the same polyvinyl alcohol were added at the time of aging, that the monomer used was 156 parts of a monomer mixture having the same composition as in Example 1 and that the weight ratio of the total quantity of polyvinyl alcohol to monomers was 22 to 78. The resulting emulsion, free from lumps or grains, had a viscosity of 910 cps. and a solid content of 24.6 percent.

EXAMPLES 13–14

Graft copolymerization was carried out in the same manner as in Example 1 except that manner of addition of polyvinyl alcohol was altered as shown in Table 3. Satisfactory emulsions, free from lumps or grains, were obtained.

and viscosity of the resulting graft copolymer emulsion was above 50,000 cps.

COMPARATIVE EXAMPLE 5

Graft copolymerization was carried out in the same manner as in Example 1 except that the mode of addition of polyvinyl alcohol and water was altered to be as follows:

Initial stage of polymerization: 27 parts by weight of polyvinyl alcohol were dissolved in 300 parts by weight of water.

During instillation of monomers and catalyst: Solution of 27 parts by weight of polyvinyl alcohol in 139.5 parts by weight of water was instilled continuously at a constant rate in the aqueous phase of the graft copolymer over a period of 3.5 hours. The

TABLE 3

| | Initially added polyvinyl alcohol, (water, parts) | Polyvinyl alcohol added during aging (water, parts) | Weight ratio of polyvinyl alcohol- initial stage/aging | Emulsion viscosity, cps. | Solid content, percent |
|---|---|---|---|---|---|
| Example 13 | 37.8 (402) | 16.2 (38) | 70/30 | 240 | 29.8 |
| Example 14 | 32.4 (389) | 22 (30) | 60/40 | 1 0 | 29.1 |

It was observed that dry films prepared from an emulsion to which had been added a larger quantity of the polyvinyl alcohol at the time of aging (Example 14) were somewhat inferior in water-resistance.

COMPARATIVE EXAMPLE 1

Graft copolymerization was carried out in the same manner as in Example 1 except that polyvinyl alcohol having a degree of saponification of 88 percent and degree of polymerization of 500 was used. The emulsion increased in viscosity during the graft copolymerization and after completion of the reaction, the viscosity of the resulting graft copolymer emulsion was above 50,000 cps.

COMPARATIVE EXAMPLE 2

Graft copolymerization was carried out in the same manner as in Example 1 except that 40.5 parts of polyvinyl alcohol wer dissolved in 337 parts of water and the solid content was fixed to be about 33 percent. The emulsion increased in viscosity during the graft copolymerization and after completion of the reaction, the viscosity of the resulting graft copolymer emulsion was above 50,000 cps.

COMPARATIVE EXAMPLE 3

Graft copolymerization was carried out in the same manner as in Example 9 except that polyvinyl alcohol having degree of saponification of 88 percent and degree of polymerization of 1,000 was used. The emulsion increased in viscosity during the graft copolymerization and after completion of the reaction, the viscosity of the resulting graft copolymer emulsion was 40,000 cps.

COMPARATIVE EXAMPLE 4

Polymerization was carried out in the same manner as in Example 1 except that polyvinyl alcohol having a degree of saponification of 98.5 percent and a degree of polymerization of 1,700 was used. The emulsion increased in viscosity during the graft copolymerization resulting graft copolymer aqueous emulsion contained a large amount of grains or lumps.

Compartive Example 5 indicates that, if polyvinyl alcohol is added during the middle period of polymerization (period of instillation of monomers and catalyst), an emulsion not having the characteristic property of the present invention is formed.

As will be apparent from the Examples, the initial stage of the graft copolymerization according to a preferred embodiment of the present invention means a period during which predetermined initial amounts of polyvinyl alcohol, vinyl monomers and a catalyst system are charged and the polymerization initiated. Then, the continuous or intermittent addition of the remaining amounts of monomers and catalyst will be started, when the initial stage of polymerization reaction ends and the main stage of the reaction starts. In the Examples, an aqueous polyvinyl alcohol solution is first charged and the temperature of the solution is adjusted to a predetermined temperature, and initial amounts of the monomer mixture and the catalyst are added to this solution to start graft polymerization, when the initial stage will end. On the other hand, the ageing stage means a period after the continuous or intermittent addition of the monomer mixture and the catalyst has ended, when the reaction is completed or the graft copolymerization reaction becomes relatively slow. Since the polymerization proceeds rapidly, only a slight amount of monomers will remain unreacted in the reaction mixture when the ageing stage starts. It will be difficult to define these stages by some measurable standards, but it is easily possible to know when the initial stage has ended and when the ageing stage begins by measuring the temperature of the reaction mixture to detect the generation of heat therein.

Further, in the practice of the present invention, the polyvinyl alcohol and the vinyl monomer dissolved in water comprise. 22 – =percent of the weight of the end product emulsion and respective amounts of monomers, catalyst and water to be added at the start of or during the graft polymerization should be properly determined by taking the final emulsion concentration into consideration. However, since reactivities of polyvinyl alcohol and monomers are high, it is easy to determine an appropriate manner of addition of the materials concerned.

The embodiments of the invention in which an exclusive property or privilege is claimed are defined as follows:

1. A process for preparing an aqueous emulsion of a graft and/or block copolymer having a high solid content of from 22 to 32 percent by weight and having a high film-forming property, which comprises the step of graft copolymerizing, in the presence of tetravalent cerium salt as an initiator, in an aqueous reaction mixture, (1) from about 82 to about 65 parts by weight of vinyl monomer, with (2) from about 18 to about 35 parts by weight of polyvinyl alcohol having an average degree of polymerization in the range of from about 450 to 1200 and a degree of saponification in the range of 96 percent to 99 percent, a first portion of from 70–85 percent by weight of the total quantity of polyvinyl alcohol being added to the reaction mixture during the initial stage of the graft copolymerization reaction and the remainder of the polyvinyl alcohol being added after substantial completion of the reaction of the vinyl monomer with said first portion of the polyvinyl alcohol.

2. A process according to claim 1, in which the tetravalent cerium salt is selected from the group consisting of cerium sulfate, cerium nitrate, ammonium cerium sulfate, ammonium cerium nitrate, ammonium cerium pyrophosphate and cerium iodide, and the cerium salt is added in an aqueous solution containing 0.3–1 N of an acid selected from the group consisting of nitric acid, hydrochloric acid, sulfuric acid and formic acid, the cerium salt being added in an amount in the range of 0.05 to 2 molar percent based on the moles of vinyl monomer, from 5 to 30 percent by weight of the cerium salt being added during the initial stage of the graft copolymerization, from 5 to 15 percent by weight of the cerium salt being added after substantial completion of the reaction of the vinyl monomer with said first portion of the polyvinyl alcohol and prior to addition of the final portion of polyvinyl alcohol, and the balance of the cerium salt being added during the progress of the graft copolymerization reaction.

3. A process according to claim 1, in which the vinyl monomer is selected from the group consisting of acrylates and methacrylates having an alkyl group of one to 18 carbon atoms, acrylonitrile, methacrylonitrile, styrene, α-methylstyrene, p-chlorostyrene, vinyl esters of fatty acids having one to 18 carbon atoms, crotonic acid esters having an alkyl group of one to 18 carbon atoms, vinyl chloride, vinylidene chloride and mixtures thereof.

4. A process according to claim 1, in which the reaction mixture also contains up to 5 percent by weight, based on the weight of said vinyl monomer, of an additional monomer selected from the group consisting of polymerizable unsaturated carboxylic acids and esters thereof in which the alkyl group contains one to 18 carbon atoms; acrylamide, methacrylamide, N-methylolacrylamide and ethers thereof; hydroxyethyl methacrylate, hydroxyethyl acrylate, glycidyl methacrylate, glycidyl acrylate, vinyl crotonate and mixtures thereof.

5. A process according to claim 3 in which the vinyl monomer comprises a mixture of from 5 to 70 percent by weight of vinyl monomer yielding a polymer having glass transition temperature below 10° C. and the balance is vinyl monomer yielding a polymer having glass transition temperature above 30° C.

6. A process according to claim 1, in which the polyvinyl alcohol is a single polyvinyl alcohol or a blend of two or more polyvinyl alcohols.

7. A process according to claim 1, in which the pH of the reaction mixture is maintained below 6.0 during the polymerization reaction.

8. A process according to claim 1, in which the temperature of the reaction mixture is maintained in the range of from about 20° C. to about 80° C. during the polymerization reaction.

* * * * *